United States Patent

Jonas et al.

[15] 3,681,393
[45] Aug. 1, 1972

[54] BENZODIOXANE DERIVATIVES

[72] Inventors: Rochus Jonas; and Helmut Müller-Calgan, Darmstadt, Germany

[73] Assignee: Merck Patent Gesellschaft mit beschrankter Haftung, Darmstadt, Germany

[22] Filed: Nov. 25, 1970

[21] Appl. No.: 92,957

[30] Foreign Application Priority Data

Nov. 27, 1969 Germany............P 19 59 562.1

[52] U.S. Cl. .........260/340.5, 260/295.5, 260/340.3, 424/278, 424/282
[51] Int. Cl. .............................................C07d 15/14
[58] Field of Search.......................260/340.3, 340.5

[56] References Cited

UNITED STATES PATENTS 3,324,143   6/1967   Moed et al.................260/340.3

FOREIGN PATENTS OR APPLICATIONS 480,330  12/1969  Switzerland...............260/340.3

Primary Examiner—Alex Mazel
Assistant Examiner—James H. Turnipseed
Attorney—Millen, Raptes & White

[57] ABSTRACT

Benzodioxane derivatives of the formula

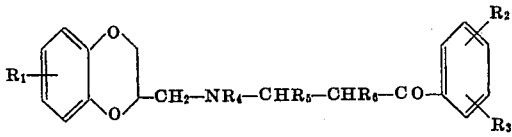

wherein $R_1$ is H or Cl, $R_2$ and $R_3$ each are H, F, Cl, $CH_3$, OH or $OCH_3$, or $R_2$ and $R_3$ collectively are —O—$CH_2$—O—, and $R_4$, $R_5$ and $R_6$ each are H or $CH_3$, including the acid addition salts thereof, exhibit psychotropic activity, including sedative, tranquilizing, neuroleptic, narcosis-potentiating, muscle-relaxing and antidepressant activity.

23 Claims, No Drawings

BENZODIOXANE DERIVATIVES

BACKGROUND OF THE INVENTION

This invention relates to novel benzodioxanes.

SUMMARY OF THE INVENTION

The novel compounds of this invention are benzodioxanes of the formula

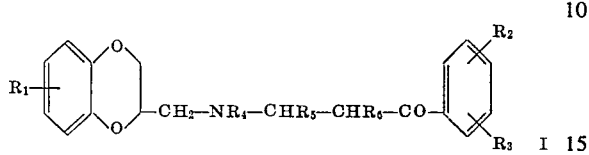

wherein $R_1$ is H or Cl, $R_2$ and $R_3$ each are H, F, Cl, $CH_3$, OH or $OCH_3$, or $R_2$ and $R_3$ collectively are $-O-CH_2-O-$, and $R_4$, $R_5$ and $R_6$ each are H or $CH_3$, including the acid addition salts thereof. These compounds exhibit with good compatibility, valuable pharmacological, especially psychotropic effects, including one or more of sedative, tranquilizing, neuroleptic, narcosis-potentiating, muscle-relaxing or antidepressant effects. These agents are particularly valuable in human and veterinary medicine when used, for example, as psychopharmacological agents.

DETAILED DISCUSSION

Of the compounds of this invention, preferred are those wherein:

a. $R_1$ preferably is H; when $R_1$ is Cl, it is preferably present in the 6- or 7-position.

b. $R_2$ and $R_3$ are H and $OCH_3$, respectively, e.g., $R_2$ is $OCH_3$ or H in the 4-position and/or $R_3$ is $OCH_3$ or H in the 3-position.

c. $R_2$ and $R_3$ both are alike, preferably H.

d. $R_4$, $R_5$ and $R_6$ each are H.

e. $R_1$ through $R_6$ each are H, or $R_1$, $R_4$, $R_5$ and $R_6$ are H, and $R_2$ and/or $R_3$ are H or $OCH_3$.

f. the compounds are in acid addition salt form, preferably a pharmaceutically acceptable acid addition salt, especially the hydrochloride.

This invention also relates to a process for the preparation of the benzodioxane derivatives of formula I and the acid addition salts thereof which comprises a. reacting an aminomethylbenzodioxane of the formula

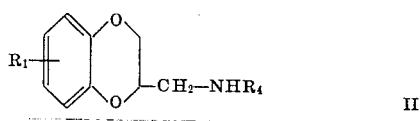

or a salt thereof, with formaldehyde or a formaldehyde-yielding compound, and an aryl ketone of formula III

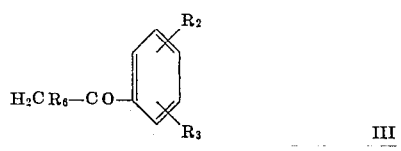

or b. reacting a compound of formula II or a salt thereof, with an aryl ketone of the formula

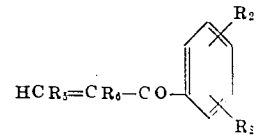

or of the formula

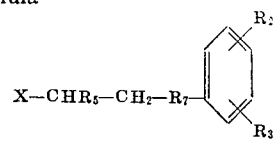

wherein X is halogen, preferably Cl or Br, and $R_7$ is a keto group ($-CO-$) or a functionally modified keto group; or c. reacting a compound of the formula

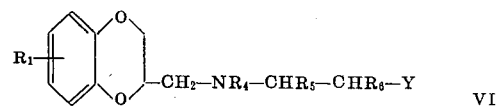

wherein Y is COOH or a functionally modified derivative thereof, under Friedel-Crafts reaction conditions with a compound of the formula

or, when Y is COCl or CN, with a compound of the formula

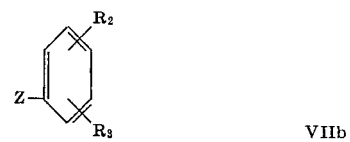

wherein Z is MgX, X being halogen, Li, ½ Cd or ½ Zn.

A still further embodiment of this invention relates to the production of compounds otherwise corresponding to formula I, above, but without the substituents $R_2$, $R_3$, $R_4$ and/or $-CO-$, or containing instead functionally modified forms of said substituents and/or containing undesired substituents or double bonds and then introducing the desired substituents into the molecule and/or removing the undesired substituents and/or double bonds or converting them into the desired substituents defined in formula I, above.

Additionally, a compound of formula I is free base form is converted into the acid addition salts thereof by treatment with an acid or a compound of formula I in free base form is obtained from an acid addition salt thereof.

In each of the above formulae, the substituents $R_1$ through $R_6$ have the same values set forth in formula I, unless stated otherwise.

The compounds of formula I and the acid addition salts thereof are prepared by reacting an aminomethylbenzodioxane of formula II, or a salt thereof, with formaldehyde or a compound yielding formaldehyde, e.g., trioxane, and an aryl ketone of formula III. Examples of suitable aryl ketones include acetophenone, p- fluoroacetophenone, m-chloroacetophenone, p-chloroacetophenone, pimethylacetophenone, p-hydroxyacetophenone, m-methoxyacetophenone, p-methoxyacetophenone, 3,4-dimethoxyacetophenone, 3,4-methylenedioxyacetophenone and propiophenone, with acetophenone being preferred. This reaction is conducted under the Mannich reaction conditions, which are well known in the literature. The reaction can be conducted with an excess of the carbonyl compound of formula III and/or in the presence of an inert solvent, preferably a lower alkanol, e.g., methanol, ethanol or isopropanol, an ether, e.g., dioxane, a hydrocarbon, e.g., benzene, or a nitro compound, e.g., nitrobenzene.

If the compounds of formula II are employed in the free base form, a corresponding amount of a mineral acid is suitably added to the reaction mixture or the reaction is conducted in acetic acid. The process is generally carried out at temperatures of between about 20° and 100° C., and preferably between about 50° to 90° C., and for example, at the boiling temperature of the solvent employed.

Usually the compounds of formula I are obtained in the form of the acid addition salts thereof when employing this reaction. These acid addition salts either crystallize directly from the reaction mixture during cooling, or they can be precipitated by the addition of a suitable solvent in which the salt is sparingly soluble or insoluble, e.g., an ether or acetone.

The aminomethylbenzodioxanes of formula II can also be converted into compounds of formula I by reaction with aryl ketones of formula IV (which are obtained, for example, by thermal splitting of $\beta$-dialkylaminoalkylaryl ketones). A preferred aryl ketone is phenylpropenyl ketone. The conditions for this reaction are well known in the literature. The chemical addition takes place, for example, in the presence of an inert solvent, preferably a lower alkanol, e.g., methanol, ethanol and isopropanol, a hydrocarbon, e.g., petroleum ether and benzene, or water.

The reaction is generally conducted at temperatures of between 15° and 100° C., preferably between 40° and 90° C. In some cases, the addition of a basic catalyst, e.g., an alkali metal hydroxide or alkali metal alcoholate, has proved to be advantageous.

As stated above, the compounds of formula I can also be prepared by reacting an aminomethylbenzodioxane of formula II with a haloketone of formula V (which can be produced, for example, from halogenides of the formula X—$CHR_5$—$CHR_6$—COX with a compound of formula VIIa). In this procedure, conditions are maintained for an N-alkylation reaction which are described in the literature. An example of a suitable haloketone is $\beta$-chloropropiophenone.

This reaction is normally conducted in an inert solvent, for example, a hydrocarbon, e.g., benzene, toluene, an ether, e.g., dioxane, or an alcohol, preferably a lower alkanol, e.g., ethanol or isopropanol. The reaction is generally conducted at a temperature of between 20° and 150° C., and preferably at the boiling temperature of the solvent employed. In some cases, it is suitable to conduct the reaction in the presence of a basic condensing agent, such as an alkali metal alcoholate, e.g., sodium or potassium methylate or ethylate, a basic salt, e.g., sodium carbonate, or a tertiary amine.

In preparing the compounds of Formula I according to this method, it is sometimes desirable to employ the aminomethylbenzodioxane in a molar excess in regard to the haloketone, e.g. a 1.5 to 2.5 fold excess, and preferably an 1.8 to 2.2 fold excess.

The compounds of formula I and the acid addition salts thereof can also be obtained in a Friedel-Crafts reaction by reacting compounds of formula VI (obtainable, for example, from acrylic acid derivatives of the formula $CHR_5 = CR_6$—Y, wherein Y is COOH or a functionally modified derivative thereof and compounds of formula II) with a compound of formula VIIa. This reaction is conducted, for example, in accordance with the conditions described in the literature. In compounds of formula VI, Y is COOH or a functionally modified COOH, preferably CO-halogen, e.g., COCl and COBr, or CN. The process is suitably carried out with an excess of a compound of formula VIIa, or in the presence of an inert solvent, e.g., a hydrocarbon, e.g., benzene or petroleum ether, a halogenated hydrocarbon, e.g., methylene chloride or ethylene chloride, and preferably carbon disulfide or nitrobenzene. In general, temperatures of between 10° and 120° C., and preferably between 30° and 100° C. are employed. Satisfactory results are obtained when a Lewis acid, e.g., $AlBr_3$, $FeCl_3$, $SbCl_5$, $SbBr_3$, $TiCl_4$, and preferably $AlCl_3$, is added to the reaction mixture to promote the reaction.

When at least one of the substituents $R_2$ and $R_3$ in a compound of formula I is OH or $OCH_3$, it is also possible to react a compound of formula VI wherein Y is CN with a compound of formula VIIa in the presence of hydrogen chloride and an acidic catalyst, preferably zinc chloride, in accordance with the Houben-Hoesch reaction, which is well known in the literature.

When Y in a compound of formula VI is an acid chloride or cyano group, the benzodioxane compounds of formula I can also be obtained by reaction with an organometallic compound of formula VIIb. The reaction is generally conducted in accordance with the conditions described in the literature in an inert solvent, e.g., a hydrocarbon, e.g., toluene or petroleum ether, or an ether, e.g., dioxane, but preferably benzene or diethyl ether. According to this embodiment of the invention, the process is advantageously conducted at temperatures of between −50° C. and the boiling temperature of the respective solvent, preferably between −20° and 85° C.

As mentioned hereinbefore, a compound of formula I can also be produced from a benzodioxane derivative otherwise corresponding to formula I wherein one or more of $R_2$, $R_3$, $R_4$ and/or —CO— are not present, or if present, are present in a functionally modified form. In addition, the starting material can also contain undesired substituents and/or double bonds which are removed or converted into the desired substituents and, where necessary, the desired substituents can be introduced thereon.

Thus, it is possible, for example, to remove the undesired N = C double bond by means of hydrogenation from a compound otherwise corresponding to formula I wherein there is present, instead of the group —$CH_2$—$NR_4$—$CHR_5$—($R_4$ = H), the group —$CH_2$—N = $CR_5$— or by —CH = N—$CHR_5$—. These compounds can be obtained, for example, by the condensation of a corresponding primary amine of formula II ($R_4 = H$) or a compound of formula VIII:

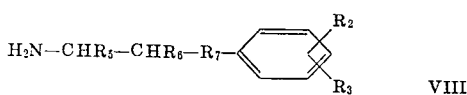

with an aldehyde of Formula X and IX, respectively:

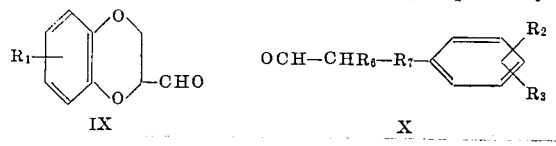

The removal of an undesired double bond is preferably accomplished by catalytic hydrogenation. Suitable catalysts include, for example, nickel, cobalt, noble metals, e.g., gold, platinum and palladium, as well as copper-chromium oxide.

The noble metal catalysts can be present as supported catalysts, such as, for example, palladium on charcoal, calcium carbonate, or strontium carbonate; as oxide catalysts, such as, for example, platinum oxide, or as finely divided metallic catalysts. Nickel and cobalt catalysts are suitably employed as Raney metals. Nickel can also be employed on kieselguhr or pumice as the support. The hydrogenation can be carried out at room temperature and under normal pressure, as well as at an elevated temperature and/or under increased pressure. Preferably, this reaction is conducted at pressures of between 1 and 100 atmospheres an temperatures of between $-80°$ C. and $+150°$ C. Suitably, the reaction is conducted in the presence of an inert solvent, for example an alcohol, such as a lower alkanol, e.g., methanol, ethanol, isopropanol, or tert.-butanol, or in ethyl acetate, dioxane, glacial acetic acid, tetrahydrofuran and/or water. During the hydrogenation step, care should be taken that the carbonyl group is not likewise reduced. Consequently, the starting compounds are advantageously employed with a protected, preferably ketalized, carbonyl group. Hydrogenation of the carbonyl group can also be avoided by conducting the hydrogenation under normal pressure and terminating the reaction after the absorption of a stoichiometric amount of hydrogen.

Compounds otherwise corresponding to formula I, but containing undesirable substituents which can be split off by hydrogenolysis, can be converted hydrogenolytically into the desired benzobioxane derivatives of formula I. For example, compounds otherwise corresponding to the compounds of formula I which contain a hydroxyl group as the $R_2$ and/or $R_3$ substituent and/or hydroxyl groups on the nitrogen atom can be employed as the starting materials. These undesired substituents can be split off the molecule by hydrogenolysis. The starting materials according to this embodiment preferably contain additional substituents which can be split off by hydrogenolysis, and normally utilized in peptide chemistry for the blocking of amino groups. These substituents include, for example, benzyl, carbobenzoxy, triphenylmethyl, p-nitrocarbobenzoxy, p-chlorocarbobenzoxy, p-phenylazobenzyloxycarbonyl, p-(p'-methoxyphenylazo)-benzyloxycarbonyl and carbo-tert.-butyloxy. Especially preferred are benzyl and carbobenzoxy. The blocking groups are suitably split off by catalytic hydrogenation, during which procedure, for example, a substituent such as $R_4$ which is H or $R_2$ and/or $R_3$ which is OH is formed. According to this embodiment of the invention, it is possible, for example, to carry out these procedures under conditions well known in the literature.

According to a further embodiment of the invention, compounds of formula I wherein, for example, $R_2$ and/or $R_3$ represent OH, can also be obtained from corresponding compounds containing substituents $R_2$ and/or $R_3$ in an esterified form by treating the same with saponifying agents. In this manner, an acyloxy, tosyloxy or other ester group, preferably lower acyloxy, especially acetoxy, propionyloxy, butyryloxy, or benzoyloxy, are converted into the free hydroxy group, preferably by hydrolysis. The acyl groups can be split off by acidic agents, for example, mineral acids, especially hydrochloric acid, hydrobromic acid, or sulfuric acid. Furthermore, suitable agents for the acidic splitting-off process are, for example, hydrobromic acid/glacial acetic acid, or Lewis acids, e.g., boron trifluoride or aluminum chloride, in solvents such as ether, acetone, or tetrahydrofuran. An alkaline splitting off of the acyl groups can also be accomplished, for instance, with alkali metal hydroxides, e.g., sodium or potassium hydroxide, or alkali metal carbonates, e.g., sodium or potassium carbonate, or with dilute ammonia.

Compounds otherwise corresponding to formula I wherein a —CHOH— group is present instead of the —CO— group (obtainable, for example, from a compound of formula II and a compound otherwise corresponding to formula V wherein —CHOH— is present instead of $R_7$) can be converted into benzodioxane compounds of formula I by treating the same with an oxidizing agent. Suitable oxidizing agents include, for example, chromic acid or manganese dioxide and preferably the dipyridine-chromium (VI) oxide complex. The compound to be oxidized is reacted in the presence of an inert solvent, e.g., dichloromethane, with an oxidizing agent, e.g., an excess of the dipyridine-chromium (VI) oxide, preferably at a temperature of between $0°$ and $50°$ C. For example, the reaction can be conducted at $25°$ C., in which case the process is terminated after about 10–20 minutes. In general, the conditions for carrying out the oxidation reaction are well known and are set forth in the literature.

A starting compound according to formula I wherein the —CO— group is present in the blocked form (obtainable, for example, by condensing an aminomethyl-benzodioxane of formula II with a haloketal of formula V wherein $R_7$ is a functionally modified, especially a ketalized, C = O group) can be converted into the corresponding compound of formula I. In particular, a ketalized or thioketalized CO-group can be liberated, according to this embodiment of the invention, by treatment with an acid. Preferred starting materials include the lower dialkyl ketals (for example dimethyl or diethyl ketals), the cyclic ketals, e.g., ethylene, propylene, trimethylene ketals, and the ethylene thioketals of the compounds of formula I.

Finally, a benzodioxane derivative corresponding to formula I wherein $R_4$ is H, or at least one of the substituents $R_2$ and $R_3$ is OH, can be converted into the corresponding N- and/or O-methyl compounds by treating the same with an equivalent amount or small excess of a methylating agent. In order to introduce the methyl substituent, conventional processes can be employed for the N- and/or O-methylation. Reactive methyl esters are preferably employed for the methylation of the above substituents, including methyl halogenides, e.g., methyl iodide, methyl bromide and methyl chloride, dimethyl sulfate, preferably methyl iodide or dimethyl sulfate. The reactants are combined, for example, in an inert solvent, e.g., methanol, ethanol, or acetone, optionally under cooling. The reaction can be carried out at temperatures of between about 0° and 140° C., preferably between 20° and 100° C. Especially suitable for the methylation of the OH substituents $R_2$ and/or $R_3$ is diazomethane. In this connection, the conditions set forth in the literature can be employed.

When $R_5$ or $R_6$ is $CH_3$, one or two additional asymmetrical carbon atoms are present in the molecule of formula I in addition to the asymmetrical carbon atom of the dioxane ring. Consequently, the compounds of formula I are obtained as racemates or a mixture of racemates, which can be separated and/or resolved by conventional methods to yield pure racemates and/or enantiomers, which are as well within the scope of this invention as the mixtures of racemates.

The racemates of this invention can be separated into their optically active components in a conventional manner by treatment with an optically active acid, e.g., tartaric acid, camphorsulfonic acid, mandelic acid, malic acid or lactic acid. Such resolution can be conducted in the conventional manner employing methods well known in the literature.

In many cases, only the racemate which is predominantly obtained is suitably isolated from the mixture. When two or three racemates are obtained, their separation can be achieved in the customary manner, for example, by crystallizing the free bases or a suitable salt thereof, by chromatography, or a combination of these separating methods.

When the compounds of this invention are produced under acidic conditions and in accordance with the above-described methods, the compounds of formula I are obtained in the form of the acid addition salts thereof. When the various methods are carried out under alkaline conditions, compounds of formula I are produced in a free base form.

A compound of formula I in free base form obtained in accordance with the processes of this invention can be converted into acid addition salts and preferably the physiologically acceptable acid addition salts thereof by treatment with an acid, in a conventional manner. The physiologically acceptable salts can be obtained by employing organic and inorganic acids, such as, for example, aliphatic, alicyclic, araliphatic, aromatic or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, isonicotinic acid, methanesulfonic acid, β-hydroxyethanesulfonic acid, p-toluenesulfonic acid, naphthalene-mono- and -disulfonic acids, sulfuric acid, nitric acid, hydrohalic acids, such as hydrochloric acid or hydrobromic acid, or phosphoric acids, such as orthophosphoric acid, etc.

Preferred acid addition salts are hydrohalogenides, especially hydrochlorides and hydrobromides, methanesulfonates, sulfates or addition salts with other strong acids. Other acids can be employed to produce other acid addition salts for resolution, isolation, characterization and/or purification purposes, e.g., picrate or dinitro-benzoate.

Optionally, a compound of formula I can be obtained from one of the acid addition salts thereof by treatment with an alkaline compound, especially an alkali metal hydroxide, or with an alkaline-reacting salt, e.g., an alkali metal carbonate, e.g., sodium or potassium carbonate. The base can then be converted, if desired, into another desirable acid addition salt.

The novel compounds can be employed in a mixture with solid, liquid and/or semi-liquid excipients conventional in pharmaceutical chemistry. Suitable carriers are those organic or inorganic materials which are suitable for parenteral, or enteral application, and which do not react with the novel compounds. These carriers include, for example, water, vegetable oils, polyethylene glycols, gelatin, lactose, amylose, magnesium stearate, talc, vaseline, cholesterol. Especially suitable for parenteral application are solutions, particularly oily or aqueous solutions, as well as suspensions or emulsions. Furthermore, suitable for enteral application are tablets, capsules or dragees.

Optionally, the compounds of this invention can also be combined with other therapeutically effective agents, e.g., with hypnotics, analgesics, spasmolytics and/or antihistamines.

The compounds of this invention, including the acid addition salts thereof, are preferably administered in an effective dosage of between 0.1 and 100 mg., preferably 1 to 80 mg. per dosage unit and preferably in admixture with 1 to 5,000 mg. of a pharmaceutically acceptable carrier.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1 a. 6.2 g. of acetophenone, 1.5 g. of paraformaldehyde, and 6.6 g. of 2-aminomethyl-1,4-benzodioxane hydrochloride are dissolved in 35 ml. of isopropanol (or ethanol) and boiled for 4 hours. Thereafter, the largest portion of the solvent is removed and the residue mixed with ether. The thus-precipitated reaction product is recrystallized from ethanol/ether, thus obtaining 2-(2-benzoylethylaminomethyl)-1,4-benzodioxane hydrochloride, m.p. 175°.

By liberating the base with aqueous alkali, extraction with ether, and mixing the ether solution with ethanolic hydrogen bromide, the hydrobromide of 2-(2-benzoylethylaminomethyl)-1,4-benzodioxane is obtained, m.p. 194°.

Analogously, using as the starting compounds:
acetophenone
p-fluoroacetophenone
m-chloroacetophenone
p-chloroacetophenone
p-methylacetophenone
p-hydroxyacetophenone
m-methoxyacetophenone
p-methoxyacetophenone
3,4-dimethoxyacetophenone
3,4-methylenedioxyacetophenone and propiophenone, the following compounds are obtained with 2-aminomethyl-1,4-benzodioxane or 2-aminomethyl-7-chloro-1,4-benzodioxane, respectively:
2-(2-benzoylethylaminomethyl)-7-chloro-1,4-benzodioxane, hydrochloride, m.p. 168°;
2-[2-(4-fluorobenzoyl)-ethylaminomethyl]-1,4-benzodioxane, hydrochloride, m.p. 190°;
2-[2-(3-chlorobenzoyl)-ethylaminomethyl]-1,4-benzodioxane, hydrobromide, m.p. 189°;
2-[2-(4-chlorobenzoyl)-ethylaminomethyl]-1,4-benzodioxane, methanesulfonate, m.p. 146°;
2-[2-(4-methylbenzoyl)-ethylaminomethyl]-1,4-benzodioxane, hydrochloride, m.p. 211°;
2-[2-(4-hydroxybenzoyl)-ethylaminomethyl]-1,4-benzodioxane, hydrochloride, m.p. 203°;
2-[2-(3-methoxybenzoyl)-ethylaminomethyl]-1,4-benzodioxane, hydrochloride, m.p. 144°;
2-[2-(4-methoxybenzoyl)-ethylaminomethyl]-1,4-benzodioxane, hydrochloride, m.p. 201°;
2-[2-(3,4-dimethoxybenzoyl)-ethylaminomethyl]-1,4-benzodioxane, hydrochloride, m.p. 191°;
2-[2-(3,4-methylenedioxybenzoyl)-ethylaminomethyl]-1,4-benzodioxane, hydrochloride, m.p. 185°;
2-(2-benzoylpropylaminomethyl)-1,4-benzodioxane, hydrochloride, m.p. 188°.

b. 2.97 g. of 2-(2-benzoylethylaminomethyl)-1,4-benzodioxane, 1 g. of potassium carbonate, and 1.42 g. of methyl iodide are allowed to stand in 30 ml. of acetone for 48 hours. The reaction solution is evaporated, water and ether are added thereto, and from the ether phase, 2-[N-(2-benzoylethyl)-N-methylaminomethyl]-1,4-benzodioxane, hydrochloride, is obtained; m.p. 153°.

c. 1 g. of 2-[2-(4-hydroxybenzoyl)-ethylaminomethyl]-1,4-benzodioxane is dissolved in 20 ml. of dioxane and mixed with an equivalent amount of ethereal diazomethane solution. The reaction mixture is concentrated by evaporation, thus obtaining 2-[2-(4-methoxybenzoyl)-ethylaminomethyl]-1,4-benzodioxane, hydrochloride, m.p. 201°.

EXAMPLE 2

8.2 g of 3,4-methylenedioxyacetophenone, 6 g. of 2-aminomethylbenzodioxane, and 1.8 g. of paraformaldehyde are adjusted, in 30 ml. of ethanol, to a pH of 4–4.5 with ethanolic hydrochloric acid, and boiled for 3 hours. Thereafter, the solvent is removed, and the residue is recrystallized from methanol, thus obtaining 2-[2-(3,4-methylenedioxybenzoyl)-ethylaminomethyl]-1,4-benzodioxane as the hydrochloride, m.p. 185°.

EXAMPLE 3

5.6 g. of phenylpropenyl ketone and 6.4 g. of 2-aminomethyl-1,4-benzodioxane are dissolved in 60 ml. of ethanol, mixed with 2 drops of 2N-sodium hydroxide solution, and allowed to stand for 1 hour at 20°. Subsequently, the solvent is removed, the residue is taken up in dilute hydrochloric acid, and extracted with ether. The aqueous phase is made alkaline, extracted several times with ether, and the ether solution is dried and evaporated. The reaction product is dissolved in a small amount of ethanol and mixed with ethereal hydrochloric acid, thus obtaining 2-(2-benzoyl-1-methylethylaminomethyl)-1,4-benzodioxane, hydrochloride, m.p. 138°.

EXAMPLE 4

6.3 g. of β-chloropropiophenone and 6.7 g. of 2-methylaminomethyl-1,4-benzodioxane are boiled in 30 ml. of isopropanol for 3 hours under reflux. Thereafter, the solution is mixed with ether, and the thus-precipitated hydrochloride is recrystallized from isopropanol/ether, thus obtaining 2-[N-(2-benzoylethyl)-N-methylaminomethyl]-1,4-benzodioxane hydrochloride; m.p. 153°.

EXAMPLE 5

9 g. of 3-(2-benzodioxanylmethylamino)-propionic acid (obtainable by cyanoethylating 2-aminomethyl-1,4-benzodioxane and subsequent saponification) is heated on a steam bath with 20 ml. of thionyl chloride for 4 hours and, after removing the excess thionyl chloride, suspended in 100 ml. of benzene. Under agitation, 13 g. of aluminum chloride is added in incremental portions to the reaction mixture, the latter is stirred for another hour, and teen poured on ice. The solution is made alkaline with sodium hydroxide solution and shaken out with ether several times. The organic phases are combined and extracted with dilute hydrochloric acid. Thereafter, the hydrochloric acid solution is neutralized and shaken out with ether. By introducing hydrochloric acid gas into the ether phase, 2-(2-benzoylethylaminomethyl)-1,4-benzodioxane hydrochloride is obtained, m.p. 175°.

EXAMPLE 6

23.7 g. of 3-(2-benzodioxanylmethylamino)-propionic acid and 13.8 g. of veratrole are agitated together with 300 g. of polyphosphoric acid for 2 hours at 80°–90°. The reaction mixture is allowed to cool, poured into water, made alkaline with sodium hydroxide solution, and several times extracted with ether. From the ether extract, after conducting the usual working-up step, there is obtained 2-[2-(3,4-dimethoxybenzoyl)-ethylaminomethyl]-1,4-benzodioxane, hydrochloride, m.p. 191°.

EXAMPLE 7

12 g. of 3-(2-benzodioxanylmethylamino)-propionitrile in 20 ml. of ether is added dropwise to a solution of phenylmagnesium bromide in 80 ml. of ether, produced from 2.43 g. of magnesium and 15.7 g.

of bromobenzene; then, the reaction mixture is boiled for one hour. The reaction mixture is poured on ice/dilute sulfuric acid, and the ether phase is separated. The solution is made alkaline, shaken out with ether, and worked up as usual, thus obtaining 2-(2-benzoylethylaminomethyl)-1,4-benzodioxane, hydrochloride, m.p. 175°.

EXAMPLE 8

1 g. of 2-(2-benzoylethylideneaminomethyl)-1,4-benzodioxane is hydrogenated in 25 ml. of ethyl acetate of 200 mg. of 5 percent palladium black at room temperature and under normal pressure until the reaction is terminated. Then, the reaction product is filtered, the filtrate mixed with ethereal hydrochloric acid, and 2-(2-benzoylethylaminomethyl)-1,4-benzodioxane hydrochloride is obtained in this manner, m.p. 175°.

EXAMPLE 9

A mixture of 1 g. of 2-[2-(4-acetoxybenzoyl)-ethylamino-methyl]-1,4-benzodioxane hydrochloride (obtainable from 4-acetoxyacetophenone analogously to Example 2), 10 ml. of saturated sodium bicarbonate solution, and 25 ml. of acetone is agitated overnight at room temperature. The reaction mixture is neutralized (pH = 6–7), extracted with ether, worked up in the usual manner, and 2-[2-(4-hydroxybenzoyl)-ethylaminomethyl]-1,4-benzodioxane is obtained; hydrochloride, m.p. 203°.

EXAMPLE 10

9.1 g. of dipyridine chromium(VI) oxide complex, dissolved in 80 ml. of methylene chloride, is introduced into a solution of 3.1 g. of 1-(2-benzodioxanylmethyl-methylamino)-3-hydroxy-3-phenylpropane in 25 ml. of methylene chloride; the reaction mixture is agitated for 20 minutes at 25°. Thereafter, the mixture is vacuum-filtered, the solution is concentrated, the remainder taken up in ether/water, and the organic phase is worked up in the usual manner, thus obtaining 2-[N-(2-benzoylethyl)-N-methylaminomethyl]-1,4-benzodioxane, hydrochloride, m.p. 153°.

EXAMPLE 11

1 g. of 2-(2-benzoylethylaminomethyl)-1,4-benzodioxane ethylene ketal (obtainable from 2-aminomethyl-1,4-benzodioxane and 1-phenyl-1,1-ethylenedioxy-3-chloropropane) is allowed to stand with 25 ml. of 2 percent aqueous hydrochloric acid for 24 hours at room temperature. The reaction mixture is made alkaline with solution of sodium hydroxide, extracted with ether, worked up in the usual manner, and 2-(2-benzoylethylaminomethyl)-1,4-benzodioxane, hydrochloride, m.p. 175°, is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A benzodioxane of the formula

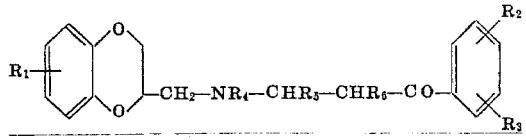

wherein $R_1$ is H or Cl; $R_2$ and $R_3$ each are H, F, Cl, $CH_3$, OH or $OCH_3$ or $R_2$ and $R_3$ collectively are $-O-CH_2-O-$; and $R_4$, $R_5$ and $R_6$ each are H or $CH_3$, including the pharmaceutically acceptable acid addition slats thereof.

2. A compound of claim 1 wherein $R_1$ is H.
3. A compound of claim 1 wherein $R_1$ is Cl.
4. A compound of claim 1 wherein $R_2$ and $R_3$ are H.
5. A compound of claim 1 wherein one of $R_2$ and $R_3$ is H and one is $-OCH_3$.
6. A compound of claim 1 wherein $R_1$, $R_4$, $R_5$ and $R_6$ each are H and $R_2$ and $R_3$ each are H or $-OCH_3$.
7. A compound of claim 6 wherein one of $R_2$ and $R_3$ is H.
8. A compound of claim 1 as a pharmaceutically acceptable acid addition salt.
9. A compound of claim 8 as the hydrochloride.
10. A compound of claim 1, 2-(2-benzoylethylaminomethyl)-1,4-benzodioxane.
11. A compound of claim 1, 2-(2-benzoylethylaminomethyl)-7-chloro-1,4-benzodioxane.
12. A compound of claim 1, 2-[2-(4-fluorobenzoyl)-ethylaminomethyl]-1,4-benzodioxane.
13. A compound of claim 1, 2-[2-(3-chlorobenzoyl)-ethylaminomethyl]-1,4-benzodioxane.
14. A compound of claim 1, 2-[2-(4-chlorobenzoyl)-ethylaminomethyl]-1,4-benzodioxane.
15. A compound of claim 1, 2-[2-(4-methylbenzoyl)-ethylaminomethyl]-1,4-benzodioxane.
16. A compound of claim 1, 2-[2-(4-hydroxybenzoyl)-ethylaminomethyl]-1,4-benzodioxane.
17. A compound of claim 1, 2-[2-(3-methoxybenzoyl)-ethylaminomethyl]-1,4-benzodioxane.
18. A compound of claim 1, 2-[2-(4-methoxybenzoyl)-ethylaminomethyl]-1,4-benzodioxane.
19. A compound of claim 1, 2-[2-(3,4-dimethoxybenzoyl)-ethylaminomethyl]-1,4-benzodioxane.
20. A compound of claim 1, 2-[2-(3,4-methylenedioxybenzoyl)-ethylaminomethyl]-1,4-benzodioxane.
21. A compound of claim 1, 2-(2-benzoylpropylaminomethyl)-1,4-benzodioxane.
22. A compound of claim 1, 2-[N-(2-benzoylethyl)-N-methylaminomethyl]-1,4-benzodioxane.
23. A compound of claim 1, 2-(2-benzoyl-1-methylethyl-aminomethyl)-1,4-benzodioxane.

* * * * *